United States Patent

[11] 3,603,816

[72] Inventor George V. Podraza
Canoga Park, Calif.
[21] Appl. No. 751,515
[22] Filed Aug. 9, 1968
[45] Patented Sept. 7, 1971
[73] Assignee The Bunker-Ramo Corporation
Canoga Park, Calif.

[54] HIGH SPEED DIGITAL CIRCUITS
10 Claims, 8 Drawing Figs.

[52] U.S. Cl. .......... 307/247, 307/246, 307/251, 307/214, 307/279
[51] Int. Cl. .......... 19/40, H03k H03k 19/00
[50] Field of Search .......... 307/247, 214, 251, 279

[56] References Cited
UNITED STATES PATENTS

| | | | |
|---|---|---|---|
| 3,292,008 | 12/1966 | Rapp | 307/251 |
| 3,355,598 | 11/1967 | Tuska | 307/251 |
| 3,479,523 | 11/1969 | Pleshko | 307/251 |
| 3,483,400 | 12/1969 | Washizuka et al. | 307/251 |
| 3,383,570 | 5/1968 | Luscher | 307/279 |

OTHER REFERENCES
" Multiphase Clocking Achieves 100N-Sec MOS Memory" by Boysel & Murphy, Electronic Design News June 10, 1968 pp. 50– 55.

*Primary Examiner*—Donald D. Forrer
*Assistant Examiner*—Harold A. Dixon
*Attorney*—Frederick M. Arbuckle ABSTRACT: Apparatus is provided in digital data equipment for transferring a binary signal to a flip-flop, and deriving therefrom a buffered output signal representing the state into which said flip-flop is being switched by anticipation means coupling the input terminal of the flip-flop to a buffer amplifier driven by the flip-flop. A multibranch, multistage selector tree is employed to selectively couple one of a number of binary signals to the flip-flop. The anticipation means and selector tree overcome and minimize the limitations in switching speeds inherent in such apparatus implemented with insulated-gate, field-effect transistors in an integrated circuit. Switching speed of the flip-flop is increased by the combination of (1) a push-pull arrangement such that when a binary signal is applied to one side the complement of the binary signal is applied to the other side, and (2) an anticipation circuit temporarily shunting current around a load resistor in series with a given one of two cross-coupled active elements.

INVENTOR.
GEORGE V. PODRAZA
BY Lindenberg + Freilich

INVENTOR.
GEORGE V. PODRAZA

BY Lindenberg & Freilich

INVENTOR.
GEORGE V. PODRAZA

BY Lindenberg + Freilich

INVENTOR.
GEORGE V. PODRAZA
BY Lindenberg & Freilich

HIGH SPEED DIGITAL CIRCUITS

BACKGROUND OF THE INVENTION

1. Field of the Invention

This invention relates generally to circuits for digital data equipment, and more particularly to an improved arrangement for selectively transferring data to a flip-flop, and deriving a buffered output therefrom.

2. Description of the Prior Art

An insulated-gate, field-effect transistor (MOSFET) is a voltage-controlled device that exhibits an extremely high input resistance ($10^2$ to $10^8$ megohms) regardless of the polarity and magnitude of the signal present at its gate. As a discrete component, that advantage alone is often sufficient to recommend it over other active elements, but in integrated circuits there is another advantage, namely, the ease with which a large number can be fabricated on a single chip together with all the interconnections desired for a functional block. The number of active elements on a chip is, more often than not, limited only by the number of external connections that can be made on the chip.

An important disadvantage of the MOSFET in integrated circuits (IC's) is its switching speed limitation due to stray capacitance which must be charged and discharged by current flowing through its channel. Stray capacitance referred to herein is the total capacitance seen at a circuit output node, and is comprised of inherent capacitance of the circuit devices, interconnection capacitances, and capacitances of the loads (usually in the form of insulated gates of other transistors) connected to said circuit node. It is generally recognized that, but for this disadvantage, IC's using MOSFET's could be operated at speeds of as much as 100 times greater, since the intrinsic cutoff frequency of the MOSFET is in the order of at least 1 GHz. Although new materials and technologies may in time increase speeds closer to the theoretical limit imposed by the intrinsic cutoff frequency of MOSFET's, significant improvements in operating speeds of IC's are presently being achieved through circuit innovations, such as multiphase clocking. Other devices may present the same disadvantages in particular circuit configurations to a greater or lesser extent.

OBJECTS AND SUMMARY OF THE INVENTION

An object of this invention is to provide improved apparatus for selectively transferring data to a flip-flop and deriving a buffered output therefrom.

Another object is to provide an improved flip-flop and output buffer arrangement.

Still another object is to provide apparatus for speeding up the operation of a flip-flop.

According to the invention, apparatus is provided for transferring a binary input signal to a flip-flop whose output is coupled to the input of a buffer amplifier. Anticipation means are also provided for coupling the input signal directly to the buffer amplifier to immediately produce a buffered output signal representing the state into which the flip-flop is being switched. A multibranch, multistage selecting tree is employed to selectively couple one of a number of input signals to the data input terminal of the flip-flop.

In a first embodiment, the buffer amplifier comprises a pair of transistors in series between a supply voltage source and a source of reference potential. A first one of said pair is connected to receive an output signal from the flip-flop and provide, at a junction between the pair (connected to the output terminal), a signal corresponding to the binary signal transferred into the flip-flop. Anticipation of the signal output from the flip-flop to the buffer amplifier is provided by a connection between the data input terminal and the control terminal of one of two transistors connected in parallel with one of said pair of transistors. The control terminal of the other of the two series-connected transistors is connected to synchronizing transfer clock pulses being applied to the flip-flop for synchronizing production of an output signal corresponding to the state in which the flip-flop is being switched in response to the binary input signal and a synchronizing transfer clock pulse. Limitations in the switching speed of the flip-flop and buffer amplifier arrangement are thereby overcome by the anticipation means.

In a second embodiment, the buffer amplifier comprises a pair of transistors connected to receive complementary output signals from said flip-flop and provide, at a junction therebetween connected to the output terminal, a signal corresponding to the binary signal being stored in the flip-flop. The anticipation means then comprises third and fourth series-connected transistors in parallel with one of the pair of transistors. One of the series-connected transistors is connected to the input terminal of the flip-flop, and the other one is adapted to receive a transfer clock pulse to synchronize production at the output terminal of a signal corresponding to a predetermined state into which the flip-flop is being switched. Fifth and sixth series-connected transistors are connected in parallel with the other of the pair of transistors when anticipation means for switching of the flip-flop in both directions is desired. One transistor is adapted to receive the complement of the binary signal at the input terminal. The other transistor is adapted to also receive the transfer clock pulse to synchronize production at the output terminal of a signal corresponding to the state into which the flip-flop is being switched when opposite the predetermined state.

A multibranch, multistage selector tree is provided with an insulated-gate, field-effect transistor, or other devices having similar characteristics, in each branch to selectively transmit to the input terminal of the flip-flop one of a number of input signals. In that manner, stray capacitance at each node between branches is limited to substantially that of switching branches connected thereto, which may be as few as two for any number of input signals to be selected. An amplifier is employed to couple the output terminal of the selector tree to the input terminal of the flip-flop. That amplifier comprises a high-input-impedance device connected to the node of the selector tree output stage in order to minimize stray capacitance seen at the node.

An improved synchronized flip-flop of the type having cross-coupled active devices with separate load devices is provided with means for temporarily shunting current around the load in series with each device, but at different times, via a low resistance path in response to a synchronizing transfer clock pulse, a binary input signal on one side, and the complement of the binary input signal on the other side. In that manner, as a given active device is being turned off during the presence of a clock pulse, the other active device is being turned on more quickly through a circuit having lower resistance than the load device connected to the active device being turned off. This push-pull arrangement is of particular advantage if the flip-flop is driving a capacitive load, such as an MOSFET structured IC, since the gate-to-channel capacitance of a transistor connected to an output terminal of the flip-flop is sufficiently high to be a limiting factor on switching speed.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
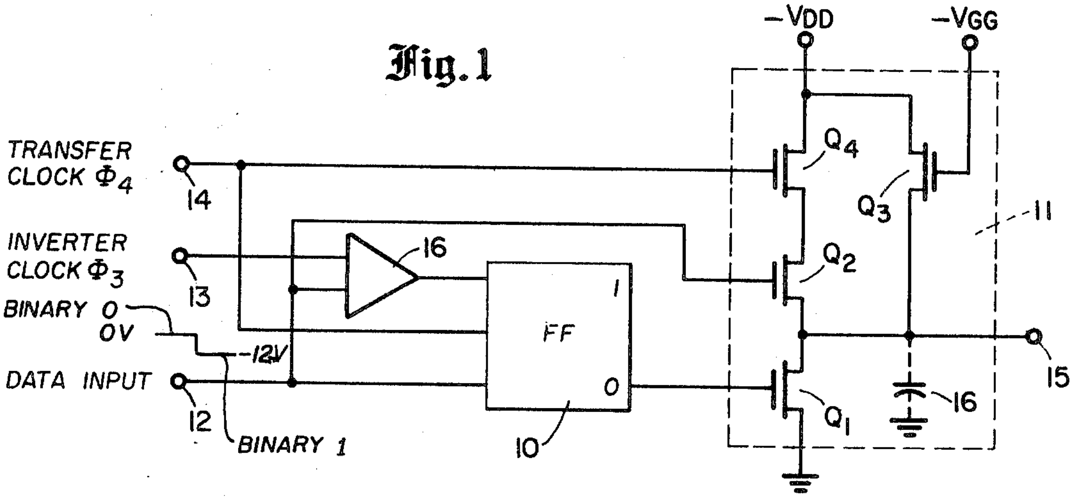
FIG. 1 illustrates an IC flip-flop and output buffer arrangement employing MOSFET's in accordance with the present invention.

Referring now to FIG. 1, a synchronized IC flip-flop 10 and output buffer 11 are shown comprising *p*-channel MOSFET's in an arrangement for receiving a binary input signal at a terminal 12 and, in response to phase clock pulses $\emptyset_3$ and $\emptyset_4$ applied at terminals 13 and 14, storing the value represented by the input signal. It is desirable to be able to simultaneously transmit a binary 1 signal from an output terminal 15 upon a binary 1 being stored, but there is a delay in the response of the buffer 11 due to the time required to switch the flip-flop 10. The present invention significantly reduces that delay.

The binary values of 0 and 1 are, in illustrative illustrative example of the present invention, arbitrarily represented by 0 and −12 volts, respectively. Accordingly, while the flip-flop 10 is storing a binary 0, the gate of a transistor $Q_1$ is at −12 volts and the gate of a transistor $Q_2$ is at 0 volts. In that manner, only transistor $Q_1$ conducts to discharge stray capacitance 16 and clamp the output terminal 15 at substantially 0 volts. A transistor $Q_3$ having its source connected to the drain of transistor $Q_1$ functions as a load by having its drain connected to a supply voltage $V_{DD}$ of −12 volts and its gate connected to a supply voltage $V_{GG}$ of −24 volts.

Figures 2, 3:
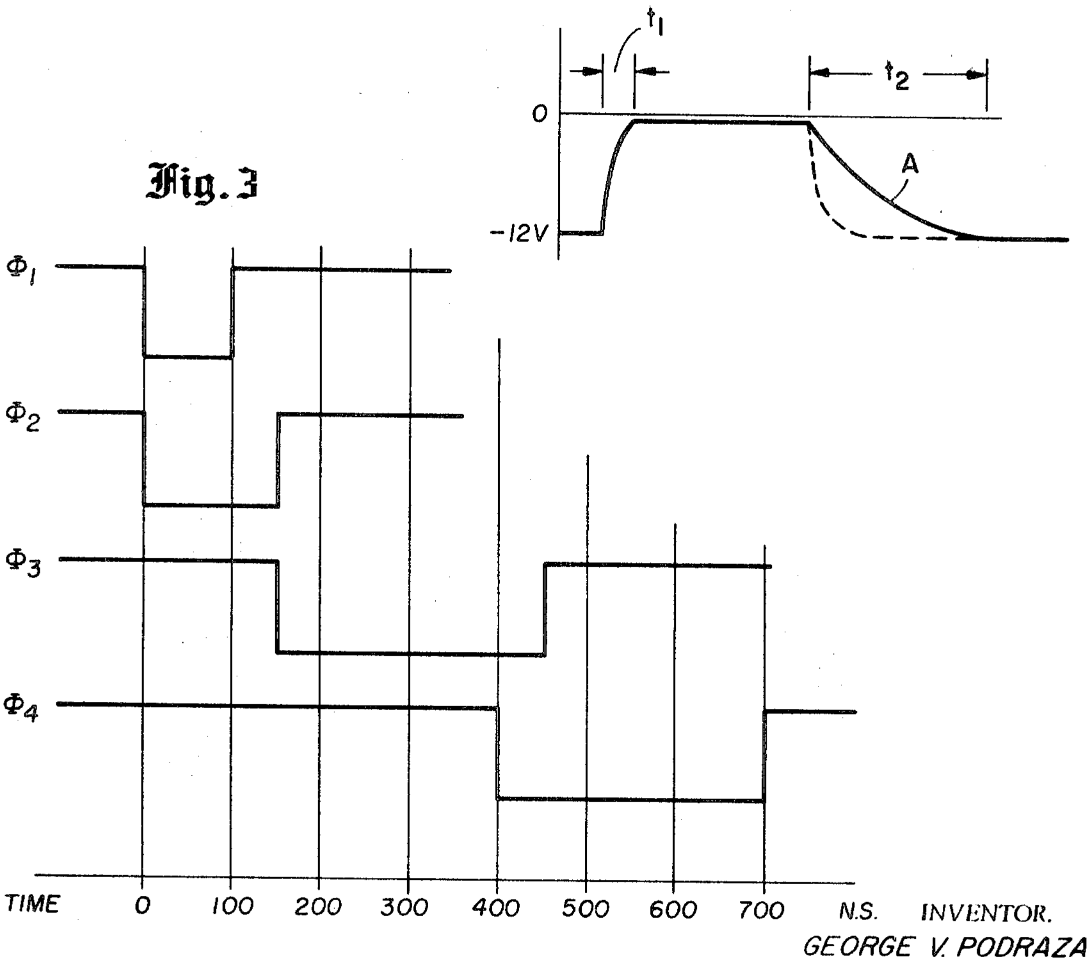
FIG. 2 illustrates a typical switching waveform for an MOSFET having a high load resistor.
FIG. 3 is a timing diagram for phase clocks employed in the present invention.

A typical switching waveform A of the transistor $Q_1$ is shown in FIG. 2 as it would appear at the output terminal 15 without the present invention. The turn on time $t_1$ is normally much shorter than the turn off time $t_2$. This is primarily due to the resistance of the load transistor $Q_3$, which is typically a factor of 10 to 30 times greater than that of the transistor $Q_1$. Accordingly, the stray capacitance 16 will quickly discharge through the relatively low resistance of transistor $Q_1$ during time $t_1$ but charge very slowly through the higher resistance of the transistor $Q_3$ during time $t_2$. Thus, the switching time is not only a function of the stray capacitance 16, but also the resistance of transistors $Q_1$ and $Q_3$, primarily the latter.

In the past, the transistor $Q_3$ has been switched on upon storing a binary 1 in the flip-flop 10 by having its gate connected to the "1" (true) output terminal of the flip-flop and so designing the transistor $Q_3$ that its resistance matches the resistance of the transistor $Q_1$. In that manner, the switching time from "0" to "1" is the same as the switching time from "1" to "0," as shown by the dotted line in the waveform A of FIG. 2. However, before a binary 1 signal being stored in the flip-flop 10 can switch the transistor $Q_3$ on (assuming its gate is directly connected to the flip-flop 10 as in the prior art), the "1" output terminal of the flip-flop 10 must be driven sufficiently negative (about −4 volts). As noted hereinbefore, there is a delay in doing that due to the finite switching time required for the transistors of the flip-flop 10. It should also be noted that if the voltage swing of the output from the flip-flop 10 is only from 0 to −12 volts, the output terminal 15 is driven only approximately −8 volts owing to the threshold voltage (−4 volts) of the transistor $Q_3$.

In accordance with the present invention, the transistor $Q_3$ is not switched on and off by the flip-flop 10, but is instead provided as a load for the transistor $Q_1$ by designing it to have a drain-source resistance of approximately 30 times that of the transistor $Q_1$ and connecting its gate to a supply voltage $V_{GG}$ of −24 volts. In that manner, the output terminal 15 is driven to the level of the drain supply voltage $V_{DD}$ (−12 volts) when the transistor $Q_1$ if off. The transistor $Q_2$ (provided as a switch driven by an anticipation circuit in accordance with the present invention) is designed to have a lower drain-source resistance equal to or half that of the transistor $Q_1$ in order to provide an RC time constant for charging the stray capacitance 16 more equal to the RC time constant for discharging it through the transistor $Q_1$. A fourth transistor $Q_4$ having the same characteristics as transistor $Q_2$ is connected in series therewith.

A transfer clock $\emptyset_4$ shown in FIG. 3 is applied to terminal 14 and to the gate of the transistor $Q_4$ in order that the transistor $Q_2$ will conduct only while the flip-flop 10 is being switched to the "1" state by a transfer clock pulse. Thereafter, charging current will flow only through the transistor $Q_3$, which has a higher drain-source resistance. Thus, an improved push-pull operation is provided for the buffer 11 with a high resistance in load transistor $Q_3$ and low resistance in the switching transistors $Q_1$ and $Q_2$. In the prior art arrangement referred to hereinbefore, push-pull operation with low output resistance was provided by designing both switching transistors with equally low drain-source resistance, but with a drain supply voltage of −12 volts, and a threshold voltage of −4 volts, the output terminal would swing between 0 and −8 volts, unless the flip-flop 10 is designed to provide a voltage swing at its output between 0 and at least −16 volts.

Operation of the IC flip-flop and output buffer arrangement thus far described with reference to FIG. 1 is improved by the anticipation circuit comprising a direct connection from the data input terminal 12 to the gate of the transistor $Q_2$ because the output terminal 15 is more quickly driven to −12 volts upon a binary 1 at the data input terminal 12 being transferred into the flip-flop 10. As noted hereinbefore, the "1" output terminal of the flip-flop 10 will not be driven negative immediately upon the transfer clock $\emptyset_4$ being applied at the terminal 14 because of the switching time required for the transistors in the flip-flop 10. Accordingly, the prior art flip-flop and push-pull buffer arrangement will not respond as quickly as the present invention upon the flip-flop being set to drive the buffer output terminal to −12 volts.

Figures 4, 5, 8:
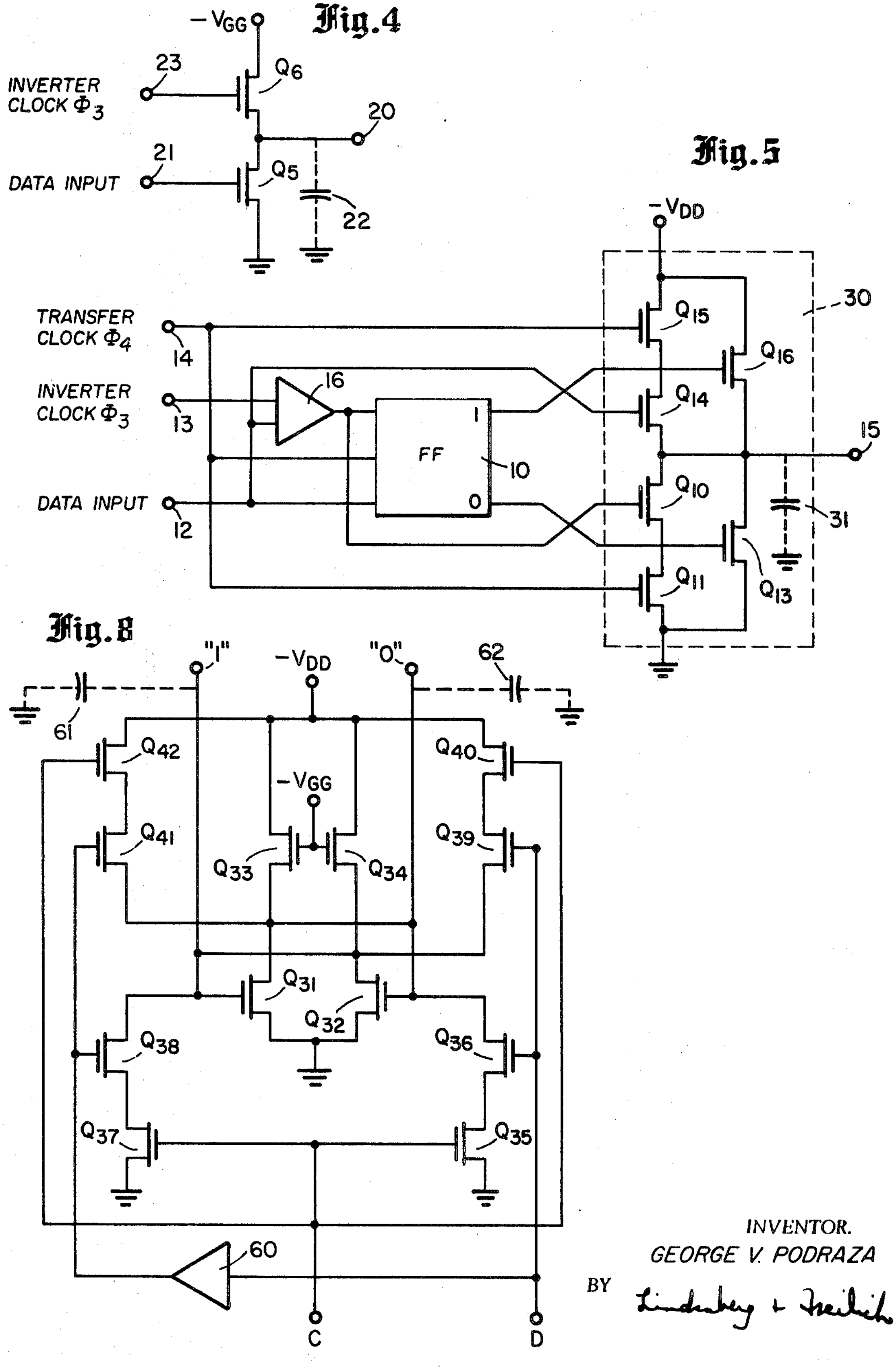
FIG. 4 illustrates a phase clocked inverter employed in the present invention.
FIG. 5 illustrates another embodiment of the present invention.
FIG. 8 illustrates a flip-flop with apparatus for speeding up its operation.

FIG. 4 shows a circuit diagram for the inverter 16 of FIG. 1 comprising a pair of transistors $Q_5$ and $Q_6$ in series between a drain supply voltage $V_{GG}$ (−24 volts) and ground. The junction between the two transistors is connected to an output terminal 20. When the data input signal at terminal 21 is a binary 1 (−12 volts), transistor $Q_5$ is switched on to discharge stray capacitance 22 and thereby provide a 0-volt output signal at terminal 20, that is then employed in the flip-flop 10 to drive the binary 1 output side thereof off upon the occurrence of a transfer clock $\emptyset_4$. When the data input is a binary 0 (0 volts), the transistor $Q_5$ is cut off. The stray capacitance 22 is then allowed to charge through the transistor $Q_6$, while its gate is driven to a −24 volts by an inverter clock $\emptyset_3$. To assure that the output terminal 20 is at −20 volts by the time the transfer clock $\emptyset_4$ is applied to the flip-flop 10, the inverter clock $\emptyset_3$ is applied about 250 nanoseconds before the transfer clock $\emptyset_4$ is applied, as shown in FIG. 3. Alternatively, terminal 23 may be connected to the gate supply voltage $V_{GG}$ in order that transistor $Q_6$ may continually charge the stray capacitance 22 while a binary 0 signal is not present at the terminal 21. In that case, transistor $Q_6$ would be designed as a load resistor with a high drain-source resistance. However, it is preferred to have a low Drain-source resistance and to phase clock the transistor $Q_6$.

Referring to FIG. 1 again, although transistor $Q_4$ is switched on, the instant transfer of a binary 1 into the flip-flop 10 commences, the transistor $Q_2$ will not start to conduct until its threshold voltage of about −4 volts is reached. It is desirable to have the transistor $Q_2$ commence driving the output terminal 15 negative when a binary 1 is being stored in the flip-flop 10 immediately upon the occurrence of the transfer clock $\emptyset_4$. That is accomplished in accordance with the present invention by the anticipation circuit just noted hereinbefore comprising a direct connection from the data input terminal 12 to the gate of the transistor $Q_2$.

There is also a delay in switching the transistor $Q_1$ on upon a binary 0 being stored due to the time required for the flip-flop 10 to drive its "0" output terminal negative. It would be desirable to have the output terminal 15 driven to 0 volts at substantially the same time that the transfer clock $\emptyset_4$ is applied. That may be accomplished in accordance with the present invention by an anticipation circuit connected from the output terminal of the inverter 16 to the gate of the transistor $Q_1$. However, in order that the transistor $Q_1$ then be conductive only while a transfer clock $Ø_4$ is applied, a fifth transistor must be connected in series with the transistor $Q_1$ and driven by the transfer clock $Ø_4$ in a manner corresponding to that illustrated by transistors $Q_{10}$ and $Q_{11}$ in another embodiment of the present invention illustrated in FIG. 5.

Referring now to FIG. 5, wherein like elements are referred to by the same reference numerals as in FIG. 1, except elements in an output buffer 30, when a binary 0 is being transferred into the flip-flop 10, the output terminal of the inverter 16 is driven to −12 volts upon the occurrence of an inverter clock $Ø_3$ to drive the flip-flop to its "0" state upon the occurrence of a transfer clock $Ø_4$. An anticipation circuit comprising a direct connection from the output of the inverter 16 to the gate of a transistor $Q_{10}$ allows stray capacitance 31 to be discharged through transistors $Q_{10}$ and $Q_{11}$ more quickly upon the occurrence of a transfer clock $Ø_4$. Thereafter, as soon as the "0" output terminal of the flip-flop 10 is driven sufficiently negative for a transistor $Q_{13}$ to conduct, an alternate direct current path is provided between the output terminal 15 and ground. The drain-source resistance of the transistor $Q_{13}$ may be made higher than the combined drain-source resistance of transistors $Q_{10}$ and $Q_{11}$. Once the transfer clock $Ø_4$ has terminated, the transistors $Q_{10}$ and $Q_{11}$ no longer conduct.

Transistors $Q_{14}$, $Q_{15}$, and $Q_{16}$ are connected in a similar arrangement such that transistors $Q_{14}$ and $Q_{15}$ conduct to charge the stray capacitance 31 negatively upon the occurrence of a transfer clock $Ø_4$ if a binary 1 is being stored in the flip-flop 10. The anticipation circuit turns transistor $Q_{14}$ on while the flip-flop 10 is being switched from its "0" to its "1" state. Once the flip-flop 10 has been switched, the transistor $Q_{16}$ is switched on so that upon termination of the transfer clock $Ø_4$, the transistor $Q_{16}$ will connect the output terminal 15 to the drain supply voltage $V_{DD}$.

The arrangement of FIG. 5 not only provides an anticipation circuit for driving the output terminal 15 to 0 volts as well as to −12 volts, but also provides a symmetrical push-pull buffer amplifier with the drain-source resistance of the transistor $Q_{16}$ made equal to the drain-source resistance of the transistor $Q_{13}$. In that manner, the buffer amplifier output resistance provided by the transistor $Q_{13}$ may be higher than provided by the corresponding transistor $Q_1$ in the embodiment of FIG. 1.

An improved arrangement for selectively transferring data to a flip-flop with a logic network (selector tree) comprising an IC of MOSFET's will now be described with reference to FIG. 6 and the timing diagram of FIG. 3.

In digital data equipment constructed of modules which operate identically on, or perform the same function in respect to, each of a plurality of bits, it is desirable to have all of the flip-flops of various registers associated with a given bit contained within one chip, with all of the inner connections and gating therebetween. Accordingly, it should be understood that all of the transistors illustrated may be provided on the same chip as the IC for the flip-flop and buffer arrangement.

Control input terminals $C_0$, $C_1$, and $C_2$ are provided to select any one of eight data sources connected to input terminals $D_0$ to $D_7$ for transfer of data to an output terminal 12 in the arrangement of FIG. 21 or the arrangement of FIG. 2. Fourteen transistors $T_1$ to $T_0$ are provided to decode the control signals $C_0$ to $C_2$, and in response thereto provide a DC path for a signal to be transferred to the output terminal 40 via a clocked inverter 41. The odd numbered transistors are connected to the input terminals $C_0$ to $C_2$, while the even numbered transistors are connected to complements of the signals at input terminals $C_0$ to $C_2$ derived by clocked inverters, such as a clocked inverter comprising transistors $Q_{20}$ and $Q_{21}$ for providing the complement of the signal on the control signal $C_0$ to the gates of transistors $T_8$, $T_{10}$, $T_{12}$, and $T_{14}$.

The load transistors $Q_{21}$ has its gate and drain connected to a preselect clock $Ø_1$, which is normally at 0volts as shown in FIG. 3 until data is to be transferred from a selected source to the output terminal 40. Upon the occurrence of a preselect clock, the gate and drain of the transistor $Q_{21}$ are driven to −24 volts to allow stray capacitance 42 to charge negative. If the control signal at the terminal $C_0$ is a binary 1 (−12 volts), the transistor $Q_{20}$ will be turned on upon termination of the preselect clock $Ø_1$, since the source of the transistor $Q_{20}$ is then at 0 volts, while the gate is negative. Accordingly, the negative charge of stray capacitance 42 is quickly discharged through the transistor $Q_{20}$ to provide a 0-volt signal complementary to the control signal at the terminal $C_0$. On the other hand, if the control signal is a binary 1 (0 volts), the transistor $Q_{20}$ is not turned on to discharge the negative potential stored in the stray capacitance 42 since, upon termination of the preselect clock $Ø_1$, both the gate and the source of the transistor $Q_{10}$ are at 0 volts. In that manner, a negative signal complementary to the 0-volt signal at the control terminal $C_0$ is transmitted to the gates $T_8$, $T_{10}$, $T_{12}$, and $T_{14}$. The complement of the control signal at terminal $C_1$ is derived in a similar manner for the transistors $T_4$ and $T_6$. The transistors $T_2$ is driven by the complement of the control signal at terminal $C_2$ in the same manner.

The select clock $Ø_2$ is applied to the gate and drain of a transistor $Q_{22}$ in order to charge stray capacitance 43 at the output node of the decoding and selecting network to approximately −20 volts until after the preselect clock $Ø_1$ has terminated and selected ones of the transistors $T_1$ to $T_4$ have been enabled by negative signal voltages from the control terminals $C_0$, $C_1$, and $C_2$ and complements of control signals thereat. However, none of the selected transistors will conduct until the select clock has $Ø_2$ has terminated, since each of eight inverting transistors coupling the data source terminals $D_0$ to $D_7$ to corresponding ones of transistors $T_7$ to $T_{14}$ (such as a transistor $Q_{23}$ coupling the data input terminal $D_0$ to the source of the transistor $T_{14}$) has its source connected to receive the select clock $Ø_2$.

Assuming the transistors $T_{14}$, $T_6$ and $T_2$ have been selectively enabled by the presence of binary 0 (0 volts) signals at terminals $C_0$, $C_1$ and $C_2$, when the select clock $Ø_2$ terminates, the source of transistor $Q_{23}$ is returned to ground potential, thereby allowing it to conduct if the signal at the terminal $D_0$ is a binary 1 (−12 volts). The negative charge stored in the stray capacitance 43 is then quickly discharged through transistors $T_2$, $T_6$, $T_{14}$ and $Q_{23}$. If the signal at the input terminal $D_0$ is a binary 0 (0 volts), transistor $Q_{23}$ will not conduct and the negative charge of the stray capacitance 43 remains as an input signal to the inverter 41.

Figure 6:
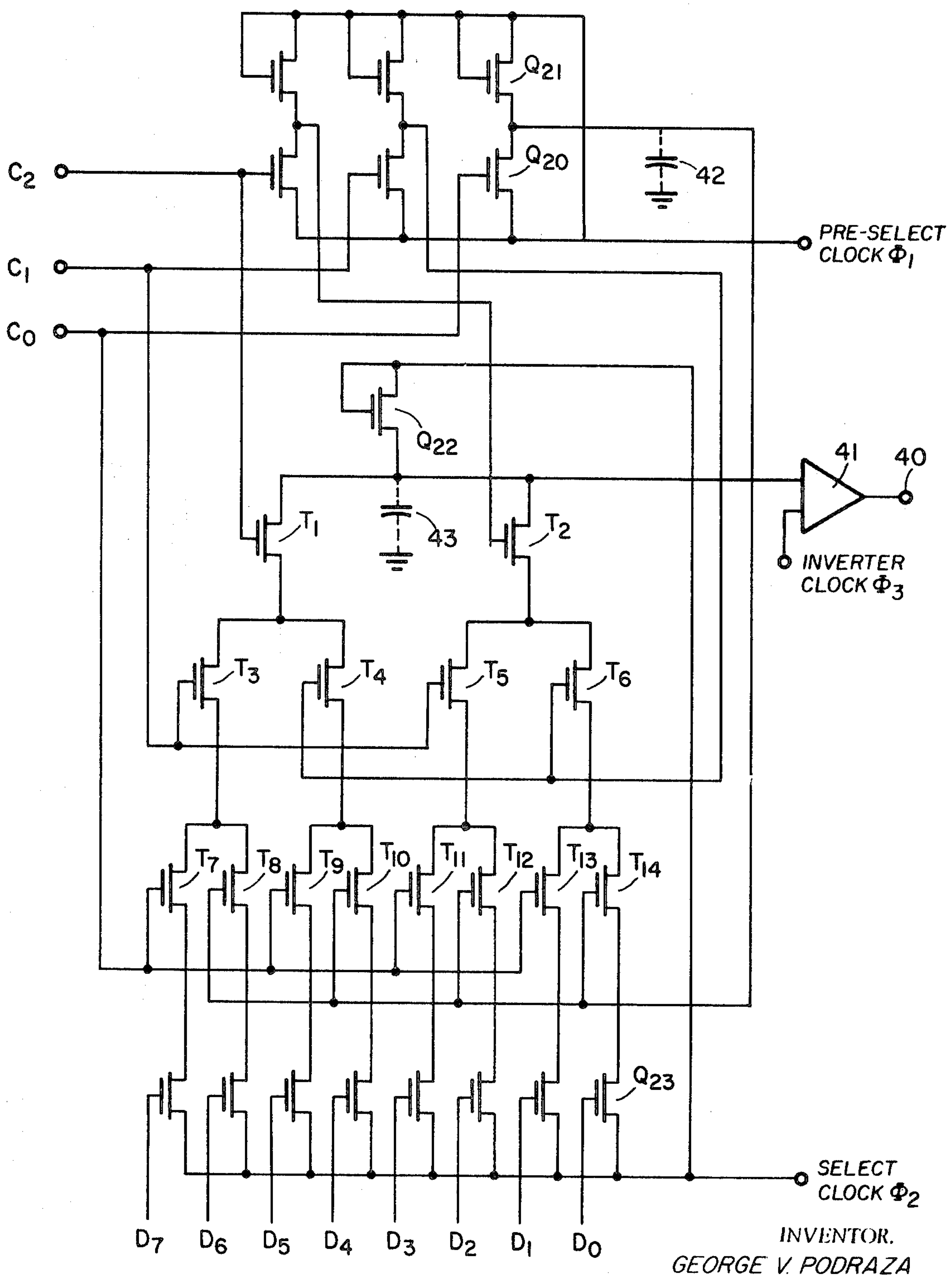
FIG. 6 illustrates an IC selector tree employing MOSFET's in accordance with the present invention.

The inverter 41 receives a clock $Ø_3$ immediately following the select clock $Ø_2$, as shown in FIG. 6. In that manner, the inverter 41 translates to the output terminal 40 the data signal present at the input terminal $D_0$. This is so because transistors $Q_{22}$ and $Q_{23}$ comprise a phase-clocked inverter such that a signal at the input terminal of the inverter 41 is the complement of the input signal at the terminal $D_0$. Thus, a selected one of a plurality of data input signals is translated to the input terminal of the inverter 41 in response to control signals applied to decoding and selecting network in an arrangement which may be described as a three-stage, two-branch selector tree, each stage responsive to a control signal at one of the input terminals $C_0$ to $C_2$ to selectively enable transistors to conduct, each transistor thus selected conducting current into a two-branch node, only one branch being conductive. A transistor $Q_{22}$, and a plurality of transistors, one for each of the data input terminals, such as the transistor $Q_{23}$, are provided in order to phase clock operations.

It should be noted that all of the transistors are of the same type as employed in the flip-flop and buffer arrangements of FIGS. 1 and 2, which is the *p*-channel, enhancement-type MOSFET. However, all of the transistors could just as well be of the *n*-channel type. The *p*-channel enhancement-type MOSFET is preferred for the convenience of selecting a 0 volt signal to represent a binary 0, and a −12 volt signal to represent a binary 1, for then a gate is nonconductive until a binary 1 (or the complement of a binary 0) signal is applied to the gate thereof and no current will flow until the gate has been driven past its threshold (−4 volts).

An advantage in using a selector tree in an IC arrangement with MOSFET technology is that less transistors are required than with other decoding arrangements. An even greater advantage is that the stray capacitance 43 at the output node includes only two branches, regardless of the number of input terminals to be selectively coupled to the output terminal 40, instead of one branch for each input terminal. Thus, the importance of the latter advantage becomes even greater as the number of input terminals to be selected is increased. For instance, by adding one more stage to the selector tree responsive to a fourth control signal $C_3$, 16 input terminals may be selectively connected to the inverter 41 without increasing the stray capacitance 43.

A disadvantage of a selector tree over an arrangement for separately decoding the control signals and in response thereto selectively turning on one of a plurality of gates connected to a common node is that each signal must pass through as many transistors in series as there are stages in the tree, each transistor being connected to an output node having the stray capacitance of two branches equal to the stray capacitance 43. However, the total capacitance thus distributed is less than the node capacitance produced by connecting all selecting gates to the output node if more than four input terminals are to be selectively connected to the inverter 41, and, of course, the difference increases as the number of input terminals is increased to, for example, 16 or 32. Accordingly, the disadvantage is more than offset by the advantage of a fixed value of stray capacitance associated with a two-branch output node.

Figure 7:
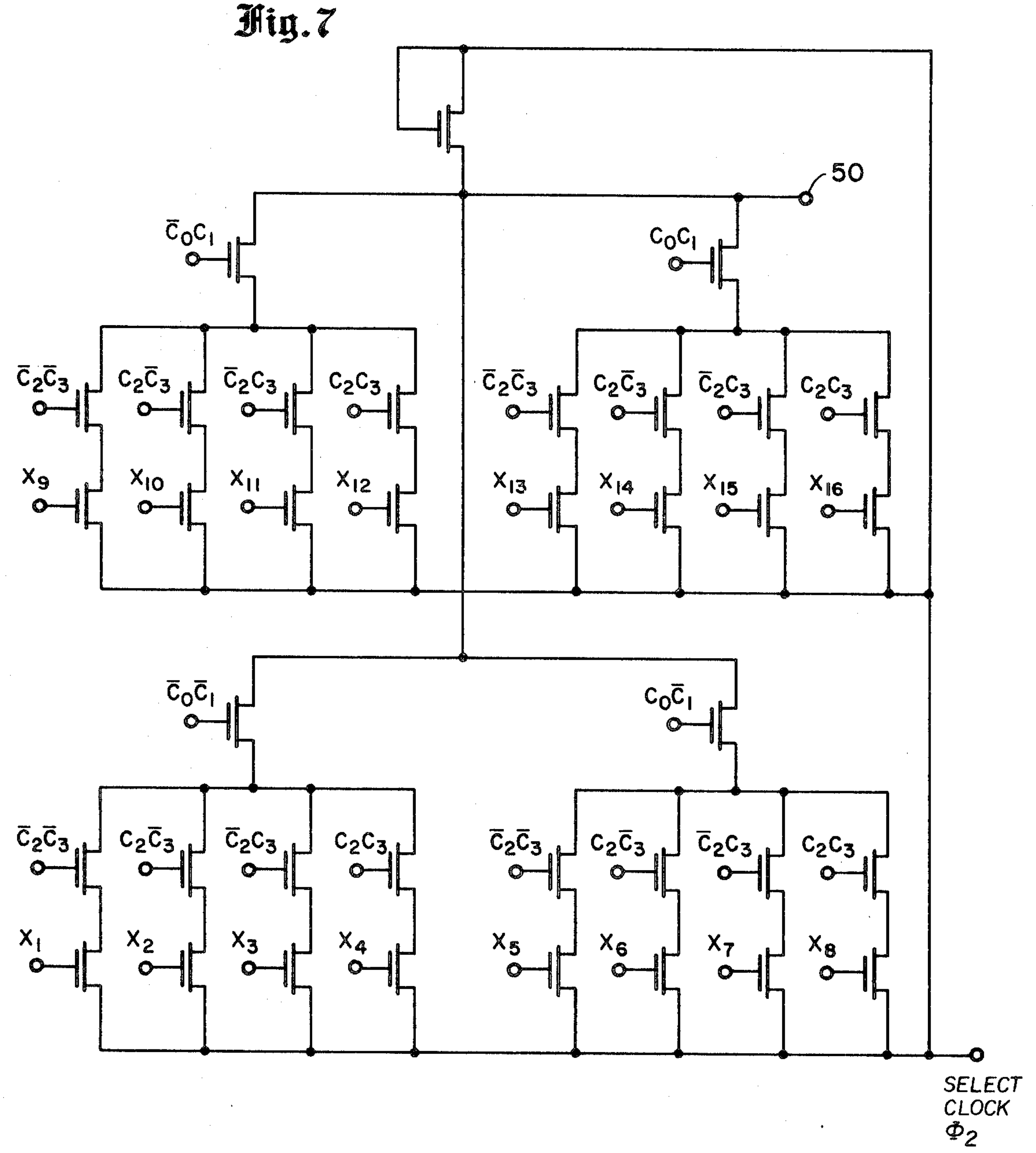
FIG. 7 illustrates an alternative IC selecting tree.

It should be noted that the selector tree provides for both decoding the control signals and selecting one of a plurality of input terminals to be connected to the inverter 41 on one IC chip in order that stray capacitance be minimized for faster operation. In some applications, it may not be possible to provide all of the stages needed in a selector tree on one chip. For example, in a given bit-slice configuration there may be so many register flip-flops to be put on one chip that there would not be room for a four-stage selector tree to select any one of 16 input terminals following the pattern illustrated in FIG. 4 for a three-stage selector tree. In that case, a two-stage four-branch selector tree may be employed, as shown in FIG. 7, by partially decoding the control signals $C_0$ to $C_3$ in advance to provide at input terminals of transistors control signals in accordance with the Boolean logic noted at the input terminal (gate) of each. A disadvantage is that there are now four branches connected to a decoder output line 50, thereby doubling the output node capacitance. The capacitance at each node of the second level is also doubled. However, offsetting this disadvantage is that by using two stages instead of four, the selected signal must be transmitted through only two transistors in series instead of four. Thus, a selector tree having more than two branches at each node may be used to minimize switching time in accordance with the present invention. If more than two branches are to be connected to each node, some decoding must be done in advance, but that may be readily accomplished using any of the techniques known to those skilled in the art, and, if necessary due to space requirements, on a separate chip, since there is usually more time available in digital data equipment for setting up control signals in advance of a given operation than there is for completing all of the necessary switching required by the operation.

Referring now to FIG. 8, an IC flip-flop comprising transistors $Q_{31}$ and $Q_{32}$ connected in series with respective load transistors $Q_{33}$ and $Q_{34}$ is synchronized by a transfer clock at a terminal C through NAND gates consisting of transistors $Q_{35}$ and $Q_{36}$ with load transistor $Q_{33}$ (to set the flip-flop to its true state in response to a true input signal at an input terminal D) and transistors $Q_{37}$ and $Q_{38}$ with load transistor $Q_{34}$ (to reset the flip-flop to its false state in response to a false input signal via an inverter 60.

In operation, a true input signal of −12 volts is inverted (complemented to a false input signal of 0 volts) at the gate of transistor $Q_{32}$ to turn it off upon the occurrence of a transfer clock at terminal C. The drain of that transistor $Q_{32}$ then goes to $V_{DD}$ (−12 volts) to provide a −12 volt signal at the true output terminal "1" and the gate of transistor $Q_{31}$. The latter conducts in response to a true output signal to clamp the false output terminal "0" and the gate of transistor $Q_{32}$ to circuit ground (0 volts). The NAND gate consisting of transistors $Q_{37}$ and $Q_{38}$ with load transistor $Q_{34}$ does not conduct while thus setting the flip-flop, since the gate of transistor $Q_{38}$ is driven false by the inverter 60. A false input signal is complemented by the inverter 60 to reset the flip-flop and thereby provide a −12 volt signal at the false output terminal "0."

The speed with which the flip-flop may be switched from one state to the other is limited by the time required to charge stray capacitances connected to the output terminals. For instance, upon setting the flip-flop, stray capacitance 61 must be charged to −12 volts through load transistor $Q_{34}$ and stray capacitance 62 must be discharged to 0 volts through transistor $Q_{31}$. Since load transistors $Q_{33}$ and $Q_{34}$ are designed with a transconductance of 10 to 20 times less than the transistors $Q_{31}$ and $Q_{32}$ to insure load saturation, the true output signal will have a short reset time $t_1$ and a relatively long set time $t_2$, as illustrated by the waveform A of FIG. 2.

In order to more quickly charge the stray capacitance 61 upon the flip-flop being set, the true output terminal "1" is connected to the drain supply voltage $V_{DD}$ during a transfer clock pulse at terminal C by a noninverting gate comprising low resistance (high transconductance) transistors $Q_{39}$ and $Q_{40}$ in series with their respective gates connected to the data input terminal D and the synchronizing terminal C. A noninverting gate comprising transistors $Q_{41}$ and $Q_{42}$ is provided to similarly speed up the charging of stray capacitance 62 upon the flip-flop being reset in response to the complement of a false (binary 0) input signal derived through the inverter 60. Thus, the flip-flop is switched from one state to the other in a push-pull manner.

Although a synchronized push-pull drive arrangement has been disclosed to increase the switching speed of an MOSFET structured flip-flop, it should be understood that such an arrangement may also be employed to advantage in IC flip-flops of other structures, and in any discrete component flip-flop of cross-coupled active devices, since the switching time of a flip-flop will always depend upon the speed with which the output terminals cross-coupled to control elements of the active devices are able to reach the supply voltage applied to load resistors in series with the active devices. However, this arrangement can be used to greatest advantage in an MOSFET structured IC when an output terminal of the flip-flop is connected to a gate of another transistor due to the capacitive load presented by the gate-to-channel capacitance thereof, which, of course, contributes to the total "stray capacitance" connected to the output terminal.

Although particular embodiments of the invention have been described and illustrated herein, it is recognized that modifications and variations may readily occur to those skilled in the art and consequently it is intended that the claims be interpreted to cover such modifications and equivalents.

I claim:

1. In digital data equipment, apparatus for transferring a binary signal at a data input terminal connected to a synchronized flip-flop, and for deriving a buffered output therefrom, comprising:

means for transferring clock pulses to a synchronizing input terminal of said flip-flop for switching the flip-flop from a given state to another in response to said binary signal upon the occurrence of a clock pulse;

a buffer amplifier having a control terminal connected to said flip-flop for producing at a buffer output terminal a signal representing the state of said flip-flop; and coupling means coupling said data input terminal to said buffer amplifier as well as to said flip-flop so that said binary signal is simultaneously applied to both for initiating switching of said flip-flop while producing at said buffer output terminal a signal corresponding to the state into which said flip-flop is being switched by said binary signal, whereby said buffered output is provided while said flip-flop is being synchronously switched.

2. Apparatus as defined in claim 1 including means for selectively coupling one of a number of binary signals to said flip-flop comprising a multibranch, multistage selector tree.

3. Apparatus as defined in claim 2 wherein said selector tree is comprised of insulated-gate, field-effect transistors, whereby stray capacitance is provided at an output switching node thereof by a number of branches connected thereto, said number of branches being less than said number of binary signals.

4. Apparatus as defined in claim 1 wherein said buffer amplifier comprises a pair of transistors connected in series between a supply voltage source and a source of reference potential, at least one of said transistors being connected to said flip-flop to provide, at a junction between said pair of transistors, a signal corresponding to said binary signal, said junction being connected to said output terminal, and wherein said coupling means includes transistor switching means for synchronizing production at said junction of a signal corresponding to the state into which said flip-flop is being switched by said binary signal while transfer of said binary signal into said flip-flop is taking place in response to a transfer clock pulse.

5. Apparatus as defined in claim 4 wherein said transistor switching means comprises:

a pair of series-connected transistors connected in parallel with one of said pair of transistors;

means connecting said data input terminal to a control terminal of one of said series-connected transistors; and means connecting said synchronizing input terminal to a control terminal of the other one of said series-connected transistors.

6. Apparatus as defined in claim 5 wherein said transistors are insulated-gate, field-effect transistors, and said control terminals are terminals connected to gates thereof.

7. Apparatus as defined in claim 1 wherein said buffer amplifier comprises a pair of transistors connected to receive complementary output signals from said flip-flop and provide, at a junction therebetween connected to said output terminal, a signal corresponding to said binary signal, and said coupling means comprises third and fourth series-connected transistors in parallel with one of said pair of transistors, a control terminal of one of said series-connected transistors being connected to said data input terminal and a control terminal of the other one of said series-connected transistors being connected to said synchronizing input terminal.

8. Apparatus as defined in claim 7 wherein said coupling means further comprises fifth and sixth series-connected transistors in parallel with the other of said pair of transistors, a control terminal of one of said series-connected transistors being connected to receive the complement of said binary signal and a control terminal of the other one of said series-connected transistors being connected to said synchronizing input terminal.

9. Apparatus as defined in claim 8 wherein said transistors are insulated-gate, field-effect transistors and said control terminals are terminals connected to gates thereof.

10. Apparatus as defined in claim 8 including means for selectively coupling one of a number of binary signals to said data input terminal comprising a multibranch, multistage selector tree.